Fig.1

Feb. 8, 1949.   G. HAZELTON   2,460,934
SPLITTING MACHINE
Filed Jan. 14, 1948   6 Sheets-Sheet 2

Inventor
George Hazelton
By his Attorney

Fig. 4

Feb. 8, 1949.    G. HAZELTON    2,460,934
SPLITTING MACHINE

Filed Jan. 14, 1948    6 Sheets-Sheet 4

Inventor
George Hazelton
By his Attorney

Feb. 8, 1949.  G. HAZELTON  2,460,934
SPLITTING MACHINE
Filed Jan. 14, 1948  6 Sheets-Sheet 5

Inventor
George Hazelton
By his Attorney

Feb. 8, 1949.  G. HAZELTON  2,460,934
SPLITTING MACHINE
Filed Jan. 14, 1948  6 Sheets—Sheet 6

Inventor
George Hazelton
By his Attorney

Patented Feb. 8, 1949

2,460,934

UNITED STATES PATENT OFFICE 2,460,934

SPLITTING MACHINE

George Hazelton, Leicester, England, assignor to United Shoe Machinery Corporation, Flemington, N. J., a corporation of New Jersey Application January 14, 1948, Serial No. 2,162
In Great Britain February 8, 1947

15 Claims. (Cl. 69—15)

This invention relates to splitting machines, and is illustrated herein as embodied in a machine of the type disclosed in United States Letters Patent No. 1,703,955, granted on March 5, 1929 on an application of W. T. B. Roberts, and having a splitting mechanism for evening work pieces such as shoe soles, for example.

The splitting mechanism of a machine of this type commonly comprises a fixed splitting-knife past which soles are fed by a pair of feed rolls. A skiving is thus cut from one side of each sole whereby the soles are evened, that is, their thickness is made uniform at all parts thereof.

Because considerable force is required to feed the soles past the knife, the feed rolls bear upon the soles with pressure which is heavy enough to compress them appreciably. This compression of the soles takes place near the edge of the knife and tends both to increase the resistance of the knife to the soles and to shorten the service of the knife between sharpenings. Moreover, since the soles are evened while in a compressed state, the sole material may expand after it has passed the knife, particularly if it is relatively soft, with the result that the soles may emerge from the machine somewhat thicker than intended, or of varying thicknesses, according to the hardness of the sole material.

A knife which is moved transversely of the direction of the feeding movement of the soles while the soles are fed to the knife presents much less resistance to the soles than does a fixed knife, and permits a reduction of the feeding force from that required by a fixed knife. With such an arrangement less pressure between the soles and the feed rolls is required, than when a fixed knife is used, to insure proper feeding of the soles, and consequently they are likely to be split to the desired thickness with greater accuracy as the roll pressure upon them is diminished.

Moreover, in the case of the moving knife a length of edge greater than the width of the soles is presented thereto and, accordingly, the knife is less subject to wear than if it were fixed.

In view of the foregoing, the invention provides, in accordance with one feature thereof, a splitting mechanism including a movable knife and fluid-operated mechanism for driving the knife alternately in opposite directions in timed relation to the operation of means for feeding work pieces past the knife, the knife being moved in one direction throughout its operation upon one work piece and in the opposite direction when it operates upon the succeeding work piece.

The direction of operation of this knife-driving mechanism in the illustrated machine is under the control of a reversing valve which is moved back and forth between two operative positions. In accordance with another feature thereof, the invention provides valve-setting mechanism and operating mechanism therefor, constructed and arranged to hold the valve in each of its operative positions and also to move it from one position to the other at the beginning of each operation of the feeding means, so as to cause the knife to begin each of its movements just before it is engaged by the sole to be split.

A controlling means operated in timed relation to the operation of the knife, and constituting a further feature of the invention, is arranged to act upon the operating means for the valve-setting means to cause successive movements of the operating means in the same direction to operate the valve-setting means in opposite directions, and hence to reverse the position of the valve for the purpose already described.

In order that the knife shall be moved steadily across a work piece being split throughout the splitting operation it is evident that the knife should move at a substantially constant rate such that the stroke of the knife is not completed until after the splitting operation has been completed. To this end, the invention also provides, in accordance with another feature thereof, speed-controlling mechanism which operates in response to any excess speed of the knife over its desired speed to diminish the flow of fluid to the knife driving mechanism, whereby the speed of the knife is immediately reduced to the desired speed. Fluid is supplied to the knife-driving mechanism under a pressure somewhat higher than that required to operate the knife at the desired speed against the greatest resistance which it may encounter, and passes a throttle-valve in flowing from the source to the reversing valve. Variable closing movements are imparted to the throttle-valve by the speed-controlling mechanism so as to maintain constantly a state of balance between the fluid-pressure in the knife-driving means and the resistance to its operation provided by the knife.

Invention is also to be recognized in novel knife-locating means which indicates to the operator, when he installs the knife in the machine after it has been sharpened, the proper position of the knife relatively to the feeding means. This means in the illustrative machine comprises a pair of knife-locating members mounted for movement together toward and away from the knife, these members being disposed opposite to the edge of the knife, one at each end thereof, when the knife is in the mid-position of its stroke. Associated with this knife-locating means is a locking member for releasably holding the knife in its mid-position, and which, upon being moved into its operative position, causes the knife-locating members to be moved into their knife-locating positions.

These and other features of the invention will now be more fully described in the following specification with reference to the drawings, and will be pointed out in the appended claims.

Figure 1:
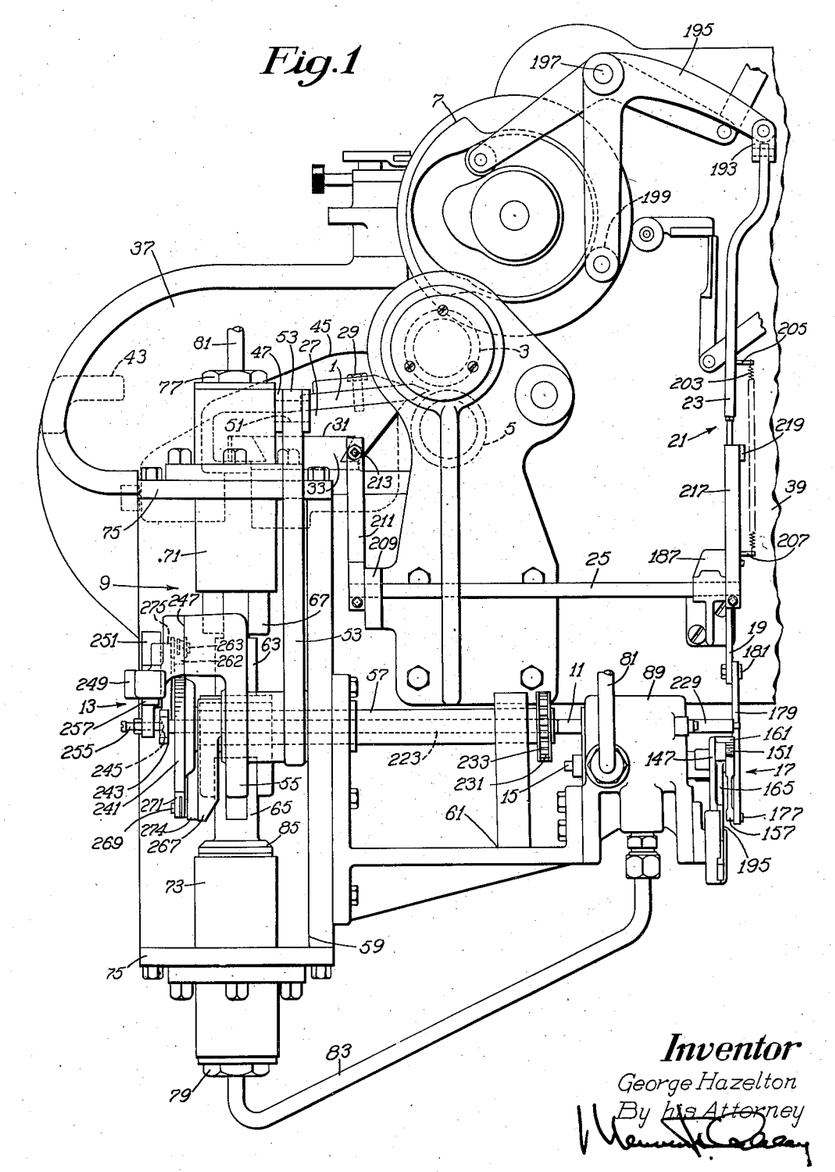
Fig. 1 is a left-hand side elevation of a rear portion of an illustrative machine including fluid-operated knife-driving mechanism in which the invention is embodied.

Except as otherwise indicated, all directions of movement and the like will be based on the assumption that the machine is viewed from the front to the rear thereof, that is, from the right to the left in Fig. 1.

In the accompanying drawings.

The illustrated machine is generally similar to that disclosed in the above-mentioned Roberts patent. As will be understood by one familiar with this machine, work pieces, such as soles for example, are first measured for thickness by being passed between a pair of rolls. Later a skiving is removed from one side of each sole as it passes a fixed splitting knife to which the soles are fed by a pair of feed rolls, the latter being adjusted by connections operated by the measuring rolls so as to present the soles to the knife in such a manner that they will be reduced to the desired uniform thickness by the removal of the skiving therefrom.

The disclosure of the illustrated machine has been abbreviated herein to include only such parts of the prior machine as are directly related to the invention, and a brief description of these parts and their functions follows. Soles are fed past a splitting knife 1 by feeding means comprising a pair of feed rolls 3, 5. As the leading end of a sole to be split approaches these rolls it trips a clutch lever (not shown by corresponding to the lever 11 of the Roberts machine) which causes the rolls 3, 5 to rotate for a period sufficiently long to feed the sole completely past the knife 1. The rolls are then stopped until the succeeding sole operates the clutch lever. During each operation of the feed rolls a cam 7, which is rotated in synchronism with the rolls by gearing, turns through one complete revolution for a purpose to be described later.

The present invention provides means for moving the knife 1 steadily lengthwise of its edge, that is, transversely of the direction of feed movement, throughout each period of operation of the feeding means. This means comprises a fluid-operated knife-driving mechanism 9 (Fig. 1) which is under the control of a throttle-valve 11, the latter being adjusted by a speed-controlling device 13. Successive movements of the knife occurs in opposite directions, the direction of operation of the knife-driving mechanism being under the control of a reversing valve 15 which is movable between two operative positions, each corresponding to one of the directions of movement of the knife. A valve-setting mechanism 17, comprising connections between a lever 19 and the reversing valve 15, is arranged to hold this valve in each of its operative positions and to turn the valve between these positions.

Shortly after the beginning of each feeding operation of the rolls 3, 5, and before the work piece engages the knife 1, the valve-setting means 17 is operated to shift the reversing valve 15, whereby a movement of the knife is initiated in a direction opposite to that in which it was moved during the preceding splitting operation. This operation of the valve-setting mechanism 17 is effected in timed relation to the operation of the feed rolls 3, 5 by driving means 21 comprising a rod 23 which actuates the lever 19 in response to rotation of the above-mentioned cam 7. During each complete revolution of the cam 7 the rod 23 is moved first upwardly and then downwardly, the upward movements of the rod being utilized to actuate the lever 19.

Successive movements of the lever 19 occur alternately in opposite directions, the rod 23 being moved for this purpose back and forth across the fulcrum of the lever 19 by a controlling means comprising a shaft 25 which is operated in timed relation to the movement of the knife 1.

Having outlined the principal structural and operating characteristics of the machine, the following description will first deal with the details of the mounting for the knife 1 and of the fluid-operated knife-driving mechanism 9.

Figures 5, 6, 7:
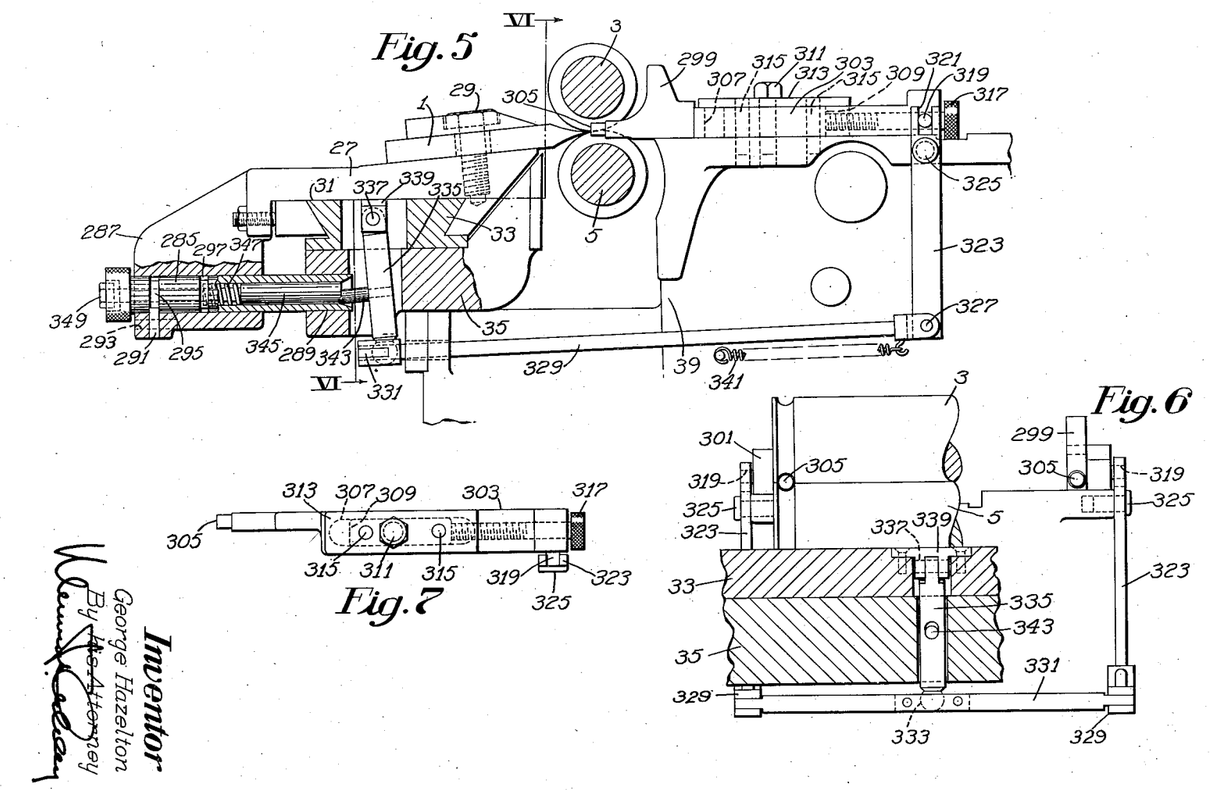
Fig. 5 is a left-hand side elevation, partly in section, showing the splitting-knife locating mechanism in its operative position.
Fig. 6 is a rear elevation, partly in section, of a part of the splitting-knife locating mechanism, the section being taken along the line VI—VI in Fig. 5.
Fig. 7 is a plan view of one of the splitting-knife locating members and mechanism for controlling it.

The splitting-knife 1 is secured upon the upper surface of a carriage 27 by screws 29 which extend through slots in the knife so arranged that the knife can be adjusted toward and away from the rolls 3, 5. The carriage has formed on its lower side a dovetail guideway 31 which receives a dovetail guide 33 with respect to which the knife slides lengthwise of its edge. The guide is fixed to a cross-piece 35 (Fig. 5) which connects two C-shaped side members 37, 37 (Figs. 1 and 2), these members being fixed to the rear portion of the frame 39 of the machine at opposite sides thereof. Other cross-pieces 41, 43 further brace the side members 37, each of the latter being provided with an opening 45 through which the knife 1 and its carriage 27 can move without obstruction at each end of their stroke.

The knife-driving mechanism 9 operates the carriage 27 through a link 47 which is pivoted at 49 to the carriage, and at 51 to a lever 53. Integral with this lever is another lever 55, these levers together constituting a bell-crank which is mounted to rotate upon a timing shaft 57 which will be described later. The timing shaft is mounted to rotate in an angular bracket 59 which is fixed to the left-hand side of the frame 39, the timing shaft being further supported by another bracket 61 which is fixed to the bracket 59. A pin 62 pivotally joins the end of the lever 55 with the adjacent ends of plungers 63, 65 to the opposite ends of which are pivoted pistons 67, 69 (Fig. 4) respectively. These pistons are arranged to slide in cylinders 71, 73 respectively which are fixed to end plates 75, 75 secured to the top and bottom ends of the angular bracket 59. Plugs 77, 79 are screwed into the outer ends of the cylinders 71, 73 respectively. Fluid under pressure is supplied to the cylinder 71 through a pipe 81 which is fixed to the plug 77; and similarly, another pipe 83 leads to the cylinder 73 through the plug 79.

It will now be evident that by applying fluid pressure alternately to the pistons 67, 69 in that order, the bell-crank 53—55 (as viewed from the front of the machine) will be swung first clockwise, and then counterclockwise, whereby the knife is moved to the right and then to the left, respectively. Any overthrow of the knife in either direction is prevented by a pair of flanges 85, 85, one of which is fixed to each of the plungers 63, 65 in such a position as to engage the inner end of the adjacent cylinder when the knife is at the end of its stroke.

Figure 11:
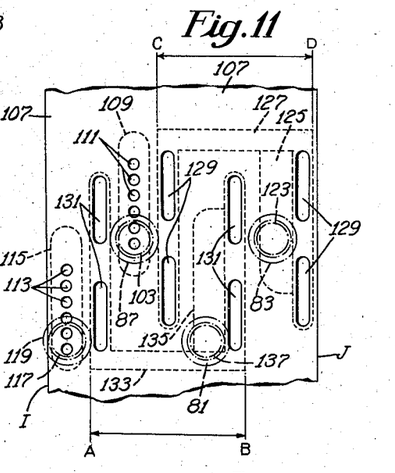
Fig. 11 is a development of the peripheral face of the sleeve of the reversing valve, the edges I and J being indicated at I and J in Figs. 9 and 10.
Figures 12, 13:
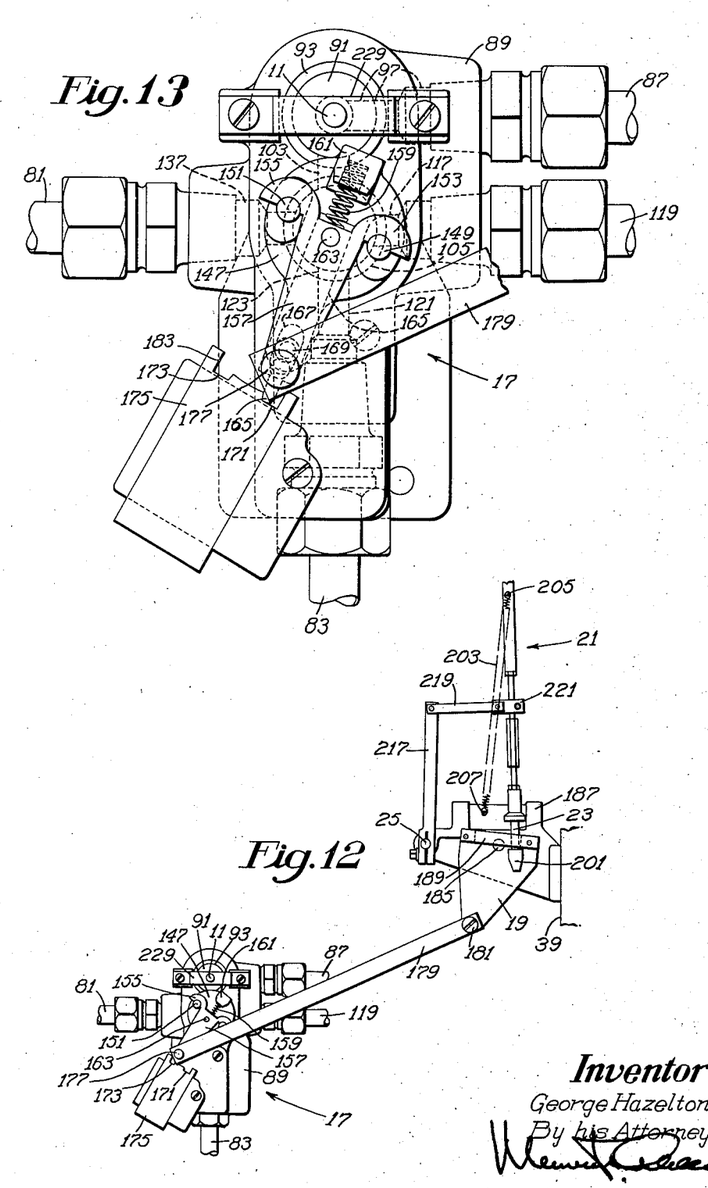
Fig. 12 is a front elevation of mechanism for operating the reversing valve, the reversing valve being set as shown in Fig. 10.
Fig. 13 is a front elevation of part of the valve-setting mechanism shown in Fig. 12 but on a larger scale than in that figure, the reversing valve being set as shown in Fig. 9.

Fluid is supplied under pressure alternately to the cylinders 71, 73 from the reversing valve 15, toward which fluid is conducted from the source (not shown) by a supply pipe 87 (Fig. 13). This pipe is connected to a valve body 89 in which the throttle-valve 11 slides axially thereof, and the reversing valve 15 rotates. The throttle-valve slides in a sleeve 91 (Fig. 8) which is mounted within another sleeve 93. The latter sleeve is received in a hole in the valve body 89, both sleeves being secured in a fixed position within the body by a screw 95. Fluid is conducted from the pipe 87 to the throttle-valve 11 through alined holes 97 (Fig. 13) in the sleeves 91, 93 and valve body 89. Opposite to the hole 97 in the sleeve 91, the throttle-valve 11 has a reduced portion 99 (Fig. 8) providing a clearance space between the valve and the sleeve 91, this space communicating with a recess 101 in the lower part of the sleeve 91. From this recess fluid is conducted through a duct 103, constituted by alined holes in the sleeve 93, the valve body 89, and a sleeve 105 fixed in the valve body 89. Fixed within the sleeve 105 is another sleeve 107 in which the reversing valve 15 rotates. The sleeve 107 has a shallow groove 109 formed in its outer periphery which receives fluid from the duct 103. A series of holes 111 (Figs 11, 9 and 10) extend radially through the sleeve 107 from the groove 109 to a central bore in the sleeve within which the reversing valve 15 rotates. These holes 111 collectively constitute an inlet port for the reversing valve. At a right angle to this inlet port there is an exhaust port consisting of a series of holes 113 which lead from the bore of the sleeve 107 outwardly to a shallow groove 115 formed in the outer periphery of the sleeve. This groove communicates with a duct 117, constituted by a series of alined holes formed in the sleeve 105 and the valve body 89, for conducting the fluid into an exhaust pipe 119 (Figs. 8 and 13) which returns the fluid to the source.

The pipe 83 from the lower cylinder communicates with a passage 121 in the valve body 89 which is alined with a hole 123 in the sleeve 105, the latter communicating with a shallow groove 125 (Figs. 11, 9 and 10) formed in the outer periphery of the sleeve 107. The groove 125 communicates with another groove 127 which extends around the outer periphery of the sleeve 107 through 180°; and from the groove 127 there extend inwardly to the bore of the sleeve 107 two sets of ports 129, 129 which are diametrically opposite to each other. Leading toward the pipe 81 for the top cylinder are similar sets of diametrically opposed ports 131, 131', these ports being connected by a shallow peripheral groove 133 in the outer side of the sleeve 107. The groove 133 communicates with another groove 135 into which opens a duct 137 which leads through the valve body to the pipe 81.

The reversing valve 15 has a series of holes 139 extending radially through it, and at right angles thereto, a second series of holes 141, each series of holes being arranged to open into recesses 143, 145 respectively, formed lengthwise of the valve 15 in its outer periphery.

Figure 10:
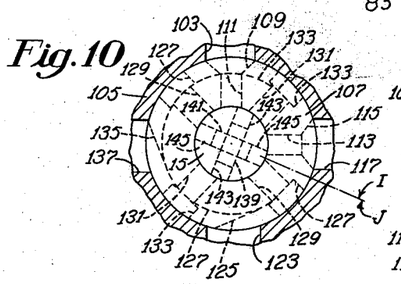
Fig. 10 is a view similar to Fig. 9 but showing the valve as set to cause the fluid to flow to the upper cylinder.

One of the operative positions of the valve 15, in which the valve is set to supply fluid to the top cylinder 71 (to cause the knife to be moved to the right), is illustrated in Fig. 10. This setting of the valve corresponds to the position of the valve indicated in Fig. 12, in which the valve has been moved to the extreme of its clockwise rotation. The flow of fluid through the valve will now be traced with reference to Fig. 10.

Fluid from the source passes through the sleeve 107 through the holes 111 and thence, in divided streams, one of which passes through the holes 139, into the opposite ports 131, these streams joining each other in the groove 133 and discharging therefrom through the duct 137 into the pipe 81 for the top cylinder 71. While fluid under pressure is thus being directed through the valve to the top cylinder, fluid is being exhausted from the bottom cylinder 73 and passes through the valve in the following manner. Fluid being exhausted passes the sleeve 105 through the hole 123, thence flowing into the recess 125 in the sleeve 107. Here the fluid flows into the groove 127, thence through the opposite ports 129, and into the recesses 145 and holes 141 in the valve 15. The previously divided streams are united in the holes 113 from which the fluid flows through the groove 115, then through the duct 117, and finally into the exhaust pipe 119 which returns the fluid to the source.

Figure 9:
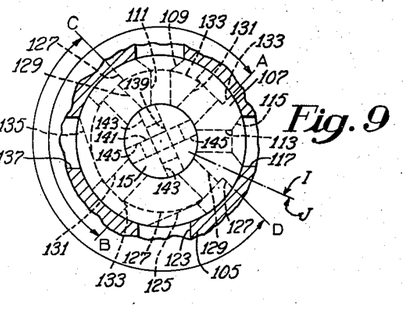
Fig. 9 is a diagrammatical view of the reversing valve as viewed from the right in Fig. 8 and showing the relation of its parts when fluid under pressure is flowing to the lower cylinder of the knife-driving mechanism.

When the valve 15 is turned in a clockwise direction from its position in Fig. 12 into its other operative position illustrated in Fig. 13, the ports of the valve have the relation illustrated in Fig. 9, causing fluid to be supplied under pressure to the bottom cylinder 73, in response to which the knife is moved to the left. The flow of fluid through the valve when it is in this position will now be traced with reference to Fig. 9.

Fluid under pressure enters the holes 111 in the sleeve 107 as before, and from these holes it moves in two streams which pass through the opposite ports 129, one stream going through the holes 139 in the valve 15. These streams flow through the groove 127, meet in the groove 125, and then pass through the hole 123 and passage 121 into the pipe 83 which leads to the bottom cylinder 73. At this time also fluid is being exhausted from the top cylinder 71. The fluid passes through the duct 137 in the sleeve 105 and then flows through the groove 133 into the opposite ports 131. The fluid then flows in one stream which passes through the holes 141 in the valve 15, and in another stream which flows through the recess 145. Both streams unite in the holes 113, and the fluid is then conducted through the groove 115, into the duct 117, and finally into the exhaust pipe 119.

The reversing valve 15 is releasably locked in each of its operative positions, and is moved from one position to the other, by the valve-setting mechanism 17 now to be described in detail. This mechanism comprises a series of connections extending from the valve 15 (Figs. 12 and 13) to, and including, the above-mentioned lever 19. The valve has an arm 147 extending downwardly therefrom on which are fixed a pair of pins 149, 151, one at each side of the axis of the valve. The upper sides of these pins provide shoulders on which are normally seated the upper arms 153, 155, respectively, of a valve operating lever 157 which has a downwardly extending central arm. The arms 153, 155 are normally held against the pins 149, 151 by a compression spring 159 which engages the top of the lever 157 between its upper arms and a lug 161 integral with the top of the valve arm 147. The lever 157 near its upper end is pivoted, by a pin 163, to the upper end of a latch 165, the lower end of which has an elongated slot 167. A stud 169 is received in this slot and is fixed to the arm 147 near its lower end. The lower end of the latch 165 is arranged to engage either one of two recesses 171, 173 formed in the upper edge of a plate 175 which is fixed to the valve body 89. The lower end of the lever 157 is pivotally connected by a stud 177 to the left-hand end of a link 179, the other end of which is pivoted at 181 to the lever 19.

The operation of the setting mechanism will now be described with reference to changing the position of the valve from that shown in Fig. 13 to that shown in Fig. 12. When the lever 19 is swung so as to move the link 179 toward the left, the lever 157 is rocked about the pin 149 against the resistance of the spring 159, the arm 155 of the lever rising off the pin 151. During the initial movement of the lever, the latch 165 is withdrawn from the recess 171 without causing any turning of the valve 15. However, as soon as the latch is raised out of the recess 171, the lever 157 transmits the thrust of the spring 159 to the pin 149, causing the valve 15 to be rotated clockwise. This rotation of the valve is terminated when the latch 165 engages a shoulder 183 on the plate 175 at the left-hand side of the recess 173 in the plate. Under the effect of the spring 159 the latch 165 now becomes seated within the recess 173, and the valve is set in its operative position, as illustrated in Fig. 9, by the engagement of both of the arms 153, 155 with the pins 149, 151, respectively. A similar sequence of events takes place when the link 179 is moved to the right to return the valve to the position in which it is illustrated in Fig. 13.

The description will now deal with the mechanism for operating the above-described valve-setting mechanism in timed relation with the operation of the feed rolls 3, 5. The lever 19 is pivoted at 185 to a bracket 187 which is fixed to the left-hand side of the frame 39. Fixed to the lever 19 near its upper edge is a horizontal plate 189 having a slot adapted to receive the lower end of the rod 23, the upper end of which is connected to a swivel block 193 (Fig. 1) carried by one arm of a bell-crank lever 195. This lever is mounted to pivot on a shaft 197 extending laterally of the machine, its other arm carrying a cam roll 199 which engages the above-mentioned cam 7.

On the lower end of the rod 23 there is fixed a head 201 beneath the plate 189, the head being adapted to engage the plate and hence to swing the lever 19, each time when the rod 23 moves upwardly. The rod is urged downwardly by a spring 203 stretched between a pin 205 fixed to the rod and another pin 207 which is fixed to the bracket 187. This spring also causes the cam roll 199 always to be held in engagement with the cam 7. The rod is moved upwardly and then downwardly, once for each revolution of the cam 7.

In order to cause successive upward movements of the rod 23 to operate the lever 19 and the rest of the valve-setting mechanism alternately in opposite directions, the rod is shifted between successive upward movements thereof across the fulcrum 185 of the lever, from one end of the plate 189 to the other, in timed relation to the movement of the knife. This controlling mechanism comprises the above-mentioned shaft 25, the shaft being mounted at one end to rotate in the bracket 187, the other end of the shaft being rotatably mounted in another bracket 209 which is fixed to the side of the frame 39. The rear end of the rod 25 has fixed thereto an arm 211 (Figs. 1 and 3) which extends upwardly into the path of movement of the carriage 27. A screw 213 threaded in the upper end of the arm 211 is adapted to be engaged by the carriage, and a spring 215 stretched between the arm and the frame 39 tends to swing the arm toward the frame. On the other end of the shaft 25 there is fixed an arm 217 to the upper end of which is pivoted a link 219. This link is also pivoted to a collar 221 which is clamped upon the rod 23. It will now be evident that near the end of each stroke of the knife toward the left, the carriage 27 will engage the screw 213; and during the remainder of the movement of the knife to the end of this stroke, the rod 23 will be moved to its left-hand position (Fig. 12). Similarly, during the first part of the stroke of the knife toward the right, the rod 23 will be moved to the right across the fulcrum 185 of the lever 19, under the influence of the spring 215.

The operation of the mechanism described thus far will now be summarized briefly. Let it be assumed that the knife is at rest at the end of its stroke toward the right, and that a splitting operation has just been completed. The valve 15 and the valve-setting mechanism 17 at this time have the positions in which they are illustrated in Fig. 12. The next work piece or sole which passes through the machine will start the operation of the feed rolls 3, 5 and the cam 7 in the manner described above. Before the leading end of this sole reaches the knife 1, the cam 7 will have caused the rod 23 (Fig. 12) to be raised, and since the rod at this time is at the right-hand end of the plate 189 the lever 19 will be swung counterclockwise. Accordingly, the valve-setting mechanism turns the valve 15 into the position illustrated in Figs. 9 and 13, whereupon the knife immediately begins to move to the left. As the knife approaches the end of its stroke to the left, the carriage 27 causes the shaft 25 to be swung counterclockwise, and the rod 23 to be moved to the left-hand end of the plate 189. When the next work piece passes through the machine it initiates another operation of the feed rolls 315 and the cam 7. Before this work piece reaches the knife, the rod 23 is raised by the cam 7, causing the lever 19 to be swung clockwise, and the valve-setting mechanism to move the valve from its position illustrated in Fig. 13 to that of Fig. 12. At the completion of this movement of the valve, when it has the setting illustrated in Fig. 10, the knife immediately begins to move to the right, such movement being continued throughout the feeding movement of the sole past the knife.

The stroke of the knife 1 is about six inches in length in each direction, and the knife moves through each of its strokes in about one second. Each operation of the feeding means occurs completely during the period when the knife is moved so that the knife is moved transversely of the sole being split throughout the splitting operation. This relation between the operation of the knife and the feeding means is obtained by the provision of a speed-controlling mechanism which insures that the knife will be steadily moved at the desired speed throughout each stroke.

Fluid-pressure is maintained at the source at a somewhat higher pressure than is necessary to move the knife at the desired speed against the greatest resistance which it encounters. The knife, therefore, tends to move at a speed higher than the desired speed, particularly when it encounters relatively light resistance. However, to insure that the knife will always move at the desired speed, the speed-controlling mechanism in the illustrated machine is arranged to impart a closing movement to the above-mentioned throttle-valve 11, in response to any tendency of the knife to exceed its desired speed, whereby the flow of fluid is diminished so as to prevent the knife-driving mechanism from operating the knife in excess of the desired speed.

Figure 8:
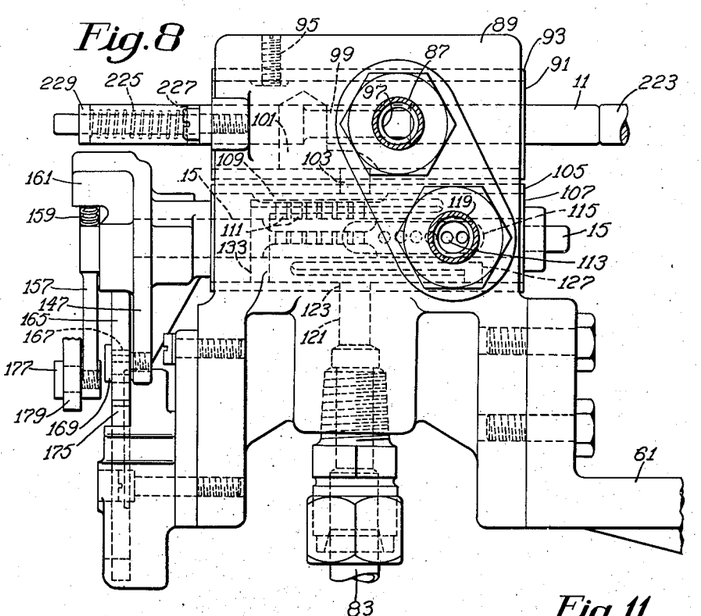
Fig. 8 is an elevation of the throttle and reversing valves of the illustrated machine as viewed from the right-hand side.

Referring to Fig. 8, the throttle valve 11 is illustrated in its "open" position and is held in abutting relation to the forward end of an operating rod 223 by a spring 225. This spring is coiled about the forward end of the valve and is compressed between a shoulder 227 on the valve and a U-shaped strap 229 which is fixed to the valve body 89. The valve 11 is thus always urged toward its "open" position by the spring 225 which also resists any closing movement imparted to the valve by the operating rod 223.

Figures 2, 3:
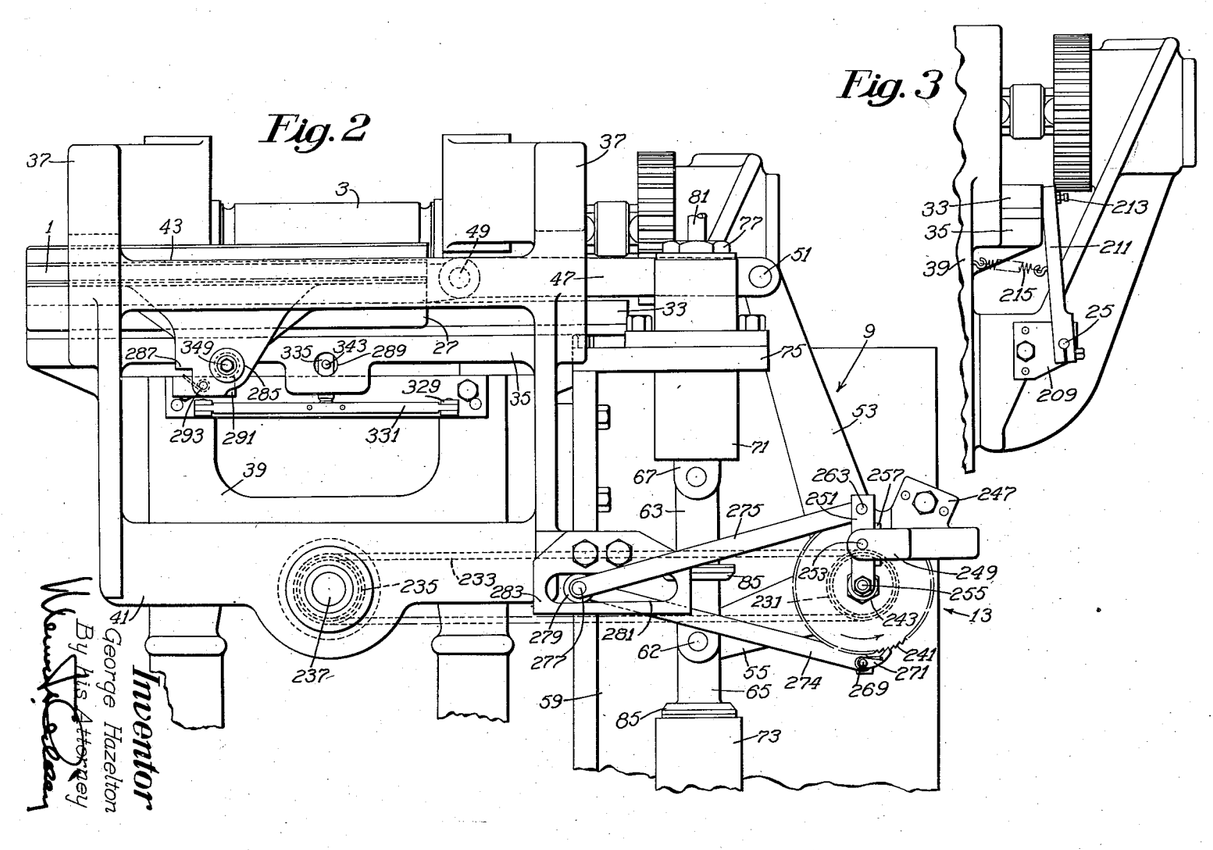
Fig. 2 is a rear elevation of a part of the structure illustrated in Fig. 1.
Fig. 3 is a rear elevation of parts of the machine which are obscured by some of the structure shown in Fig. 2.
Figure 4:
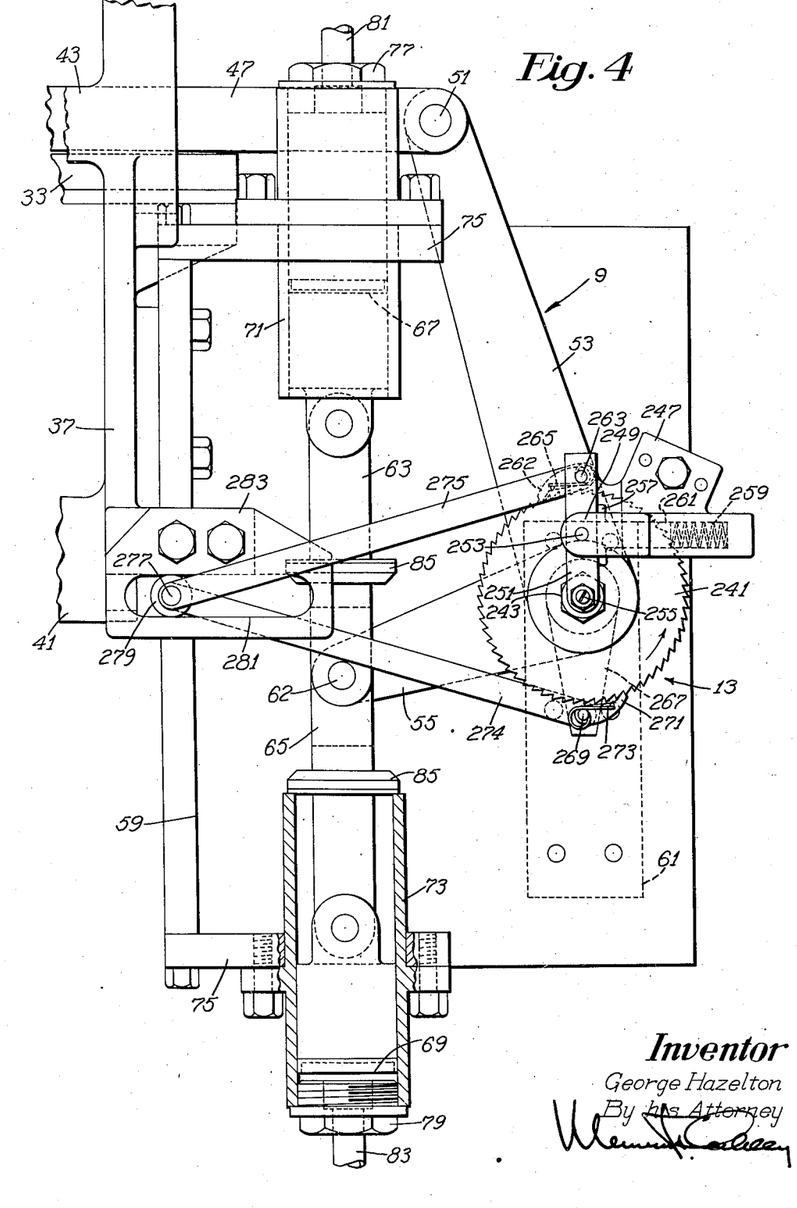
Fig. 4 is a rear elevation, partly in section, showing parts of the device for regulating the speed of the knife-driving mechanism but to a larger scale than that of Fig. 2.

The speed-controlling mechanism, of which the above-mentioned operating rod 223 is a part, will now be described in detail. It is to be understood that the above-mentioned timing shaft 57 (Figs. 1 and 2) is driven at a constant speed having a predetermined relation to the desired speed of the knife. The timing shaft is thus driven by a sprocket 231 over which runs a chain 233 which is driven by another sprocket 235 carried by a central drive shaft 237. On the rear end of the timing shaft 57 there is fixed a speed-limiting member in the form of a ratchet wheel 241 which rotates in a counterclockwise direction as viewed from the rear of the machine (Figs. 2 and 4). The above-mentioned operating rod 223 is mounted to slide freely lengthwise thereof inside of the timing shaft 57, the rear end of this rod terminating in a head 243 having a hollow conical cam face 245 formed therein. Integral with the above-mentioned bell crank 53—55 is a speed indicating member 247 which overhangs the ratchet 241 and has an arm 249 on which a lever 251 is pivoted at 253. In the lower end of the lever 251 is threaded a screw 255 having a pointed end adapted to engage the cam face 245 and normally to be seated thereon at its center. The lever 251 is normally held in this position by a T-shaped slide 257 which is yieldingly held against the lever by a spring 259. The slide is mounted to move toward and away from the lever in a recess 261 formed in the arm 249, the spring 259 being mounted in the same recess. At the upper end of the lever 251 a pawl 262 is pivoted thereto on a stud 263, the pawl being arranged to overlie the toothed periphery of the ratchet wheel 241. A light spring 265 holds the pawl against the ratchet wheel.

Let it now be assumed that the knife 1 is moving to the right (to the left in Fig. 4) and is being accelerated so as to exceed the predetermined desired speed of the knife represented by the speed of rotation of the speed limiting member, that is, the ratchet 241. At the beginning of any overtravel or leading movement of the speed indicating member 247 relatively to the ratchet wheel 241, the pawl 262 engages a tooth on the ratchet wheel thereby preventing the stud 263 from rotating at an angular velocity higher than that of the ratchet wheel. However, further leading movement of the indicating member 247 may take place and such movement, when the stud 263 is fixed relatively to the ratchet wheel, causes the lever 251 to be swung about the stud 263, whereupon a camming action takes place between the screw 255 and the cam face 245 on the operating rod 223. This camming action causes the rod 223 to be moved forwardly and, accordingly, to impart a closing movement to the valve 11. Thus the supply of fluid to the knife-driving mechanism is diminished and the speed of the knife is reduced immediately to the desired speed.

When the knife is moved in the opposite direction (that is, toward the right in Fig. 4) at a speed in excess of the desired speed, the lever 251 is moved opposite to the direction in which it was moved before, but with the same effect upon the throttle valve 11, since any movement of the screw 255 away from the center of the cam face 245 causes the operating rod 223 to impart a closing movement to the valve 11. The mechanism for thus operating the lever 251 when the knife moves to the right (Fig. 4) will now be described in detail. An arm 267 is mounted to swing freely on the timing shaft 57 between the ratchet 241 and the lever 55. A stud 269 fixed on the lower end of the arm pivotally supports a pawl 271 which is held against the periphery of the ratchet wheel by a light spring 273. One end of a link 274 is pivoted to the stud 269, the other end of this link being pivoted to another link 275 by a pin 277 on which a roll 279 is rotatably mounted. The roll is arranged to travel crosswise of the machine in a slot 281 formed in a plate 283 which is fixed to one of the side members 37. The link 275 is pivotally connected at its upper end to the lever 251 by the stud 263.

Assuming now that the knife is moving to the right (Fig. 4) the indicating member 247, carrying with it the lever 251, will be rotated in a clockwise direction. Through the operation of the links 275 and 274, the arm 267 and pawl 271 will be rotated in a counterclockwise direction, that is, in the same direction in which the ratchet wheel 241 is rotated. If the movement of the knife exceeds the desired speed, the pawl 271 will prevent any angular movement of the stud 269 in excess of that of the ratchet wheel 241. Thus, the stud 263 also will be permitted to move at the speed of, but no faster than, the ratchet wheel. Therefore, movement of the indicating member 247 in excess of this speed in a clockwise direction will cause the lever 251 to be swung to the right about the stud 263. Such movement of the lever will, as pointed out above, cause a closing movement of the throttle valve 11 and, accordingly, any appreciable excess speed of the knife over the desired speed will again be prevented.

Whenever the carriage 27 and knife 1 come to rest at the end of a splitting operation they are at one end or the other of their stroke. Since the knife at such times extends through one or the other of the openings 45 in the side members 37, it is desirable to move the knife to a predetermined central position laterally of the machine for the sake of convenience in removing it for purposes of sharpening or renewal. Moreover, when the knife is in this position it is also in operative relation to knife-locating means, to be described below, for indicating to the operator the proper position of the knife on the carrier when he installs the knife.

To allow the knife and carriage to be moved to their central position, the link 47 is to be disconnected from the lever 53. The carriage may then be moved to its central position by the operator, leaving the lever at one end or the other of its path of movement.

The carriage 27 is held in its central position by a plunger 285 which is mounted in a lug 287 integral with the carriage and is adapted to slide thereon into a hole 289 in the center of the cross-piece 35. A spring-actuated latch 291, pivoted at 293 on the lug, is arranged to fit within a groove 295 in the plunger to hold it in its operative position. The latch cooperates with another groove 297 in the plunger to hold it away from the cross-piece 35 when the machine is in operation.

When the plunger 285 is moved into its operative position, a pair of knife-locating members 299, 301 (Figs. 5, 6 and 7), one being mounted opposite to the edge of the knife at each end thereof, are moved into such a position that if the knife is clamped upon the carriage 27 with its edge in engagement with these members the knife will be located in the proper relation to the feed rolls 3, 5. Upon moving the plunger 285 to its inoperative position, the knife-locating members are retracted from the knife to prevent the knife from being dulled by the members during the normal operation of the machine.

Each of the members 299, 301 comprises a horizontal bar 303 extending in a direction forwardly and rearwardly of the machine (i. e., at right angles to the edge of the knife) and supported by the frame 39. Each bar has a rear end-face 305, against which the knife edge may be positioned, and also a slot 307 extending heightwise and lengthwise thereof. Located in the slot is a guiding block 309 which is secured to the machine frame by a screw 311, a plate 313, and a pair of dowels 315 fixed to the plate. The guiding blocks guide the members 299, 301 during forward or rearward movement thereof, and act as stops for limiting the movement of the members toward the knife. The front end-portion of each bar 303 has threaded in it a horizontal adjusting screw 317 extending lengthwise of the bar. The rear end of this screw is arranged to engage the front end of the aforesaid guiding block 309. By rotating the screws 317 independently when the knife-locating members are urged toward the knife, the members may be adjusted into their proper positions relatively to the feed rolls 3, 5.

Each bar 303 has projecting laterally from it a pin 319 which is received in a slot 321 extending vertically in the upper end of a lever 323. These levers are pivoted, near their upper ends, on studs 325 secured in the frame 39. To lower ends of these levers are pivotally connected at 327 the forward ends of rearwardly extending rods 329. The rear ends of the rods are pivotally connected to the opposite ends of a horizontal swinging bar 331 extending laterally of the machine, and lying below the aforesaid cross-piece 35. At its center the swinging bar 331 is connected by a ball-joint 332 to the lower end of an upwardly extending arm 335, the upper end-portion of which arm is pivoted on a horizontal pin 337 extending laterally of the machine and supported in a small bracket 339 secured to the guide 33. Alined and elongated openings in the cross-piece 35 and guide 33, through which the arm 335 passes, permit limited swinging movement of the arm forwardly and rearwardly of the machine. A tension spring 341 is connected to each of the rods 329 and to the frame of the machine. These springs tend to move the rods rearwardly and, through the levers 323, to move the knife-locating members 299, 301 forwardly away from the knife edge. Forward movement of the members 299, 301 is limited by the engagement of the arm 335 with the rear face of the opening in said cross-piece 35 through which the arm extends. The arm 335 has secured thereto, between its upper and lower ends, a rearwardly projecting stud 343, the rear end of which is arranged to be engaged by the forward end of a rod 345 mounted to slide within the plunger 285 axially thereof. The rod is urged forwardly in the plunger by a relatively strong spring 347 in the plunger, such movement being limited by a head 349 on the rod which is adapted to engage the outer end of the plunger.

Upon moving the plunger 285 inwardly to lock the carriage 27 in its mid-position as described above, prior to removing the knife for grinding or renewal, the rod 345 engages the stud 343 and then yieldingly swings the arm 335 against the tension of the springs 341. The connections between the arm and knife-locating members 299, 301 move the latter into their knife-locating positions, as determined by the engagement of the adjustable screws 317 with the front ends of the blocks 309 which guide the members. The plunger 285 is moved further forwardly, after rearward movement of the knife-locating members has been stopped, to bring the groove 295 in the plunger into position to receive the latch 291 on the knife carriage 27 which, by its engagement with the groove, locks the plunger in its forward position. The forward movement of the plunger 285, after rearward movement of the knife-locating members has been arrested, causes the spring 347 behind the rod 345 to be further compressed, and thus ensures that the knife-locating members will be held in their operative positions. If in their rearward movement one of the knife-locating members is stopped before the other, movement of one end of the swinging bar 331 will be stopped and the other end of the bar will be moved forwardly until rearward movement of the other member is arrested. When the knife-locating members have been moved to their operative positions, the operator will, in repositioning the knife 1 on its carriage, move the knife until its cutting edge abuts against the end faces 305 of the members and then clamp the knife to its carriage 27.

To prepare the machine for operation again, the operator next withdraws the plunger 285 from the cross-piece 35 until the latch 291 engages the groove 297. During this movement of the plunger, the knife-locating members 299, 301 are moved away from the knife under the influence of the springs 341. The carriage 27, now being free to move on the slide 33, is moved to permit the link 47 to be connected again to the lever 53.

Having described my invention, what I claim as new and desire to secure by Letters Patent of the United States is:

1. In a machine of the class described, a splitting knife, means for feeding a work piece past said knife, a carrier for said knife mounted for movement lengthwise of the edge of said knife, fluid-operated means for moving said carrier alternately in opposite directions, said means comprising a reversing valve movable between two positions to control the direction of movement of said carrier, valve-setting means for moving said valve from each of its positions to the other, driving means for said valve-setting means, said driving means being operated in timed relation to said feeding means, and controlling means acting upon said driving means in timed relation to the movement of said knife to cause successive driving movements of said driving means to operate said valve-setting means in opposite directions.

2. In a machine of the class described, a splitting knife, means for feeding a work piece past said knife, a carrier for said knife mounted for movement lengthwise of the edge of said knife, fluid-operated means for moving said carrier alternately in opposite directions, said means comprising a reversing valve movable between two positions to control the direction of movement of said carrier, valve-setting means for moving said valve from each of its positions to the other, driving means for said valve-setting means, said driving means being operated in timed relation to said feeding means, and controlling means operated by said carrier and constructed and arranged to act upon said driving means to cause successive driving movements thereof in the same direction to operate said valve-setting means in opposite directions.

3. In a machine of the class described, a splitting knife, means for feeding a work piece past said knife, a carrier for said knife mounted for movement lengthwise of the edge of said knife, fluid-operated means for moving said carrier alternately in opposite directions, said means comprising a reversing valve movable between two positions to control the direction of movement of said carrier, valve-setting means for moving said valve from each of its positions to the other, said valve-setting means comprising a lever mounted to swing in opposite directions about a fulcrum, driving means for said valve-setting means, said driving means comprising a member connected to said lever and movable thereon across its fulcrum, and controlling means constructed and arranged normally to hold said member at one side of the fulcrum of said lever, said controlling means being actuated by said carrier at one end of its stroke to move said member across the fulcrum of said lever, whereby said lever is swung in opposite directions by successive movements of said member in the same direction.

4. In a machine of the class described, a splitting knife, means for feeding a work piece past said knife, fluid-operated means for moving said knife lengthwise of its edge alternately in opposite directions, said means comprising a reversing valve movable between two operative positions to control the direction of movement of said knife, valve-setting means for moving said valve from one of its operative positions into the other, said valve-setting means comprising an operating member carried by said valve and movable in opposite directions thereon, locking means for holding said valve releasably in each of its operative positions, connections between said member and locking means constructed and arranged to release the latter in response to movement of said lever in either direction, connections between said member and valve constructed and arranged to move said valve upon the release of said locking means in the direction of movement of said operating member, and means for moving said operating member in opposite directions in timed relation to the operation of said feeding means.

5. In a machine of the class described, a splitting knife, means for feeding a work piece past said knife, fluid-operated means for moving said knife lengthwise of its edge alternately in opposite directions, said means comprising a rotary reversing valve movable between two operative positions to control the direction of movement of said knife, valve-setting means for turning said valve from one of its operative positions into the other, said valve-setting means comprising a lever mounted to rock in opposite directions upon said valve about either one of two axes at opposite sides of said valve, a spring arranged to resist rocking movement of said lever, locking means for releasably holding said valve in each of its operative positions, said locking means comprising a latch connected to said lever and movable to release said valve in response to rocking movement of said lever in either direction, said lever being arranged to utilize the pressure of said spring to turn said valve in the direction in which said lever is rocked when said valve is released, and means for rocking said lever in opposite directions in timed relation to the operation of said feeding means.

6. In a machine of the class described, a splitting knife, means for feeding a work piece past said knife, fluid-operated means for moving said knife lengthwise of its edge alternately in opposite directions, said means comprising a rotary reversing valve movable between two operative positions to control the direction of movement of said knife, valve-setting means for moving said valve from one of its operative positions into the other, said valve-setting means comprising an operating lever mounted to rock upon said valve against a shoulder thereon at each side of its axis, a latch pivoted to said operating lever between said shoulders, a plate cooperating with said latch to hold said valve in each of its operative positions, said latch also being mounted to slide on said valve away from said plate in response to rocking movement of said operating lever, a yielding member for holding said operating lever normally against both of said shoulders, said lever being constructed and arranged upon rocking on said valve to withdraw said latch from said plate and to impart the pressure of said yielding member to that shoulder about which the lever is rocked whereby said valve is turned when said latch is released from said plate, and means for rocking said operating lever in opposite directions in timed relation to the operation of said feeding means.

7. In a machine of the class described, a splitting knife, means for feeding a work piece past said knife, said knife being mounted for movement lengthwise of its edge, fluid-operated mechanism for moving said knife while the work piece is fed thereto, said mechanism comprising a throttle valve for controlling the speed of its operation, a speed-limiting member arranged to move at a constant speed having a predetermined relation to the desired speed of said knife, a speed-indicating member mounted for movement at a speed corresponding to that of said knife and in a path parallel to that of said speed-limiting member, and means constructed and arranged to adjust said valve in response to relative movement between said speed-indicating and speed-limiting members whereby the speed of the knife is varied into conformity with that of said speed-limiting member.

8. In a machine of the class described, a splitting knife, means for feeding a work piece past said knife, said knife being mounted for movement lengthwise of its edge, fluid-operated mechanism for moving said knife while the work piece is fed thereto, said mechanism comprising a throttle valve for controlling its speed of operation, a speed-limiting member arranged to move at a constant speed having a predetermined relation to the desired speed of said knife, a speed-indicating member operated by said mechanism and mounted for movement in a path parallel to that of said speed-limiting member, and means constructed and arranged to impart a closing movement to said valve in response to a leading movement of said speed-indicating member relatively to said speed-limiting member whereby the speed of the knife is reduced into conformity with that of said speed-limiting member.

9. In a machine of the class described, a splitting knife, means for feeding a work piece past said knife, said knife being mounted for movement lengthwise of its edge, fluid-operated mechanism for moving said knife while the work piece is fed thereto, said mechanism comprising a throttle valve for controlling its speed of operation, a speed-limiting member arranged to move at a constant speed having a predetermined relation to the desired speed of said knife, a speed-indicating member operated by said mechanism and mounted for movement in a path adjacent and parallel to that of said speed-limiting member, a valve actuating lever mounted to move with said speed-indicating member and to swing with respect thereto, means for preventing movement of one end of said lever in excess of that of said speed-limiting member thereby to provide a fulcrum for said lever which moves with and at the speed of said speed-limiting member, said lever being arranged to swing about its fulcrum in response to a leading movement of said speed-limiting member relatively to said speed-indicating member, and connections between said lever and valve for imparting a closing movement to said valve when said lever is swung with respect to said speed-indicating member.

10. In a machine of the class described, a splitting knife, means for feeding a work piece past said knife, said knife being mounted for movement lengthwise of the edge, fluid-operated mechanism for moving said knife while the work piece is fed thereto, a throttle valve for controlling the speed of operation of said mechanism, a speed-limiting member arranged to rotate at a constant speed having a predetermined relation to the desired speed of said knife, said mechanism including a crank mounted to rotate coaxially with said speed-limiting member, and connections between said crank and throttle valve constructed and arranged to impart a closing movement to said valve in response to a leading movement of said crank relatively to said speed-limiting member whereby the speed of the knife is reduced into conformity with that of said speed-limiting member.

11. In a machine of the class described, a splitting knife, means for feeding a work piece against the edge of the knife, a carrier for said knife, a support with respect to which said carrier is mounted to slide with a predetermined stroke parallel to the edge of said knife, knife-locating members one facing the edge of said knife at each end thereof when said carrier is in a selected intermediate position in its stroke, said members being mounted for movement toward and away from said knife, and mechanism for moving said members together into their knife-locating positions, said mechanism comprising a locking member mounted for movement on said carrier into engagement with said support thereby to secure said carrier against movement from its said intermediate position.

12. In a machine of the class described, a splitting knife, means for feeding a work piece against the edge of said knife, a carrier for said knife, a support with respect to which said carrier is mounted to slide parallel to the edge of said knife with a predetermined stroke, knife-locating members one facing the edge of said knife at each end thereof when said carrier is in a selected intermediate position in its stroke, connections between said members for moving them together toward and away from said knife, and a locking member movable upon said carrier into engagement with said support and said connections when said carrier is in its intermediate position successively to secure said carrier to said support and then to operate said connections whereby said knife-locating members are moved into their knife-locating positions.

13. In a machine of the class described, a splitting knife, means for feeding a work piece against the edge of said knife, a carrier for said knife, a support with respect to which said carrier is mounted to slide parallel to the edge of said knife with a predetermined stroke, knife-locating members one facing the edge of said knife at each end thereof when said carrier is in a selected intermediate position, a lever carried by said support, connections between said lever and said knife-locating members for moving said members into their knife-locating positions in response to movement of said lever, a plunger mounted to slide on said carrier into engagement with said support and lever successively when said carrier is in its intermediate position thereby to lock said carrier to said support and to actuate said lever.

14. In a machine of the class described, a splitting knife, means for feeding a work piece against the edge of said knife, a carrier for said knife, a support with respect to which said carrier is mounted to slide parallel to the edge of said knife with a predetermined stroke, knife-locating members, one facing the edge of said knife at each end thereof when said carrier is in a selected intermediate position, a lever carried by said support, connections between said lever and knife-locating members for yieldingly urging said members away from said knife, means for limiting movement of said members toward said knife, and a plunger mounted on said carrier for movement into engagement with said support and said lever when said carrier is in its intermediate position thereby to secure said carrier against movement and to cause said knife-locating members to be moved into their knife-locating positions in response to movement of said lever.

15. In a machine of the class described, a splitting knife, means for feeding a work piece against the edge of said knife, a carrier for said knife, a support with respect to which said carrier is mounted to move parallel to the edge of said knife with a predetermined stroke, knife-locating members, one facing the edge of said knife at each end thereof when said carrier is in a selected intermediate position in its stroke, said members being mounted for movement toward and away from said knife, stops for limiting the movement of said knife-locating members toward said knife, operating means for said knife-locating members constructed and arranged normally to urge them away from said knife, and a locking member mounted for movement upon said carrier into said support when said carrier is in its intermediate position, said locking member comprising a yielding element arranged to cooperate with said operating means to move said knife-locating members against said stops in response to inward movement of said locking member.

GEORGE HAZELTON.

No references cited.